United States Patent [19]

Judge

[11] Patent Number: 4,817,784

[45] Date of Patent: Apr. 4, 1989

[54] ZERO PRESSURE ACCUMULATING CONVEYOR CONTROL

[75] Inventor: Gregory R. Judge, Louisville, Ky.

[73] Assignee: Figgie International Inc., Willoughby, Ohio

[21] Appl. No.: 382,586

[22] Filed: May 27, 1982

[51] Int. Cl.[4] .............................................. B65G 13/06
[52] U.S. Cl. ...................................... 198/781; 198/810
[58] Field of Search ......................... 198/781, 460, 810

[56] References Cited

U.S. PATENT DOCUMENTS

| | | |
|---|---|---|
| 3,225,893 | 12/1965 | Currie . |
| 3,355,008 | 11/1967 | Milazzo . |
| 3,420,355 | 1/1969 | De Good et al. ............ 198/781 |
| 3,499,524 | 3/1970 | Milazzo . |
| 3,612,247 | 10/1971 | Pipp . |
| 3,612,248 | 10/1971 | Wallis . |
| 3,768,630 | 10/1973 | Inwood et al. ............. 198/781 |
| 3,770,102 | 11/1973 | DeGood . |
| 3,814,233 | 6/1974 | DeCourcy .................. 198/782 |
| 3,840,110 | 10/1974 | Molt et al. . |
| 3,930,573 | 1/1976 | Wyman ...................... 198/810 |
| 3,934,707 | 1/1976 | Bowman . |
| 4,088,224 | 5/1978 | Kittredge . |
| 4,096,942 | 6/1978 | Shepherd . |
| 4,108,303 | 8/1978 | Vogt et al. . |
| 4,109,783 | 8/1978 | Vogt ........................... 198/781 |
| 4,174,777 | 11/1979 | Riehle . |
| 4,264,004 | 4/1981 | Harwick ..................... 198/781 |
| 4,273,239 | 6/1981 | Thwaites et al. ........... 198/781 |
| 4,293,065 | 10/1981 | Dyer et al. . |
| 4,383,605 | 5/1983 | Harwick ..................... 198/781 |

*Primary Examiner*—Frank E. Werner
*Assistant Examiner*—Cheryl L. Gastineau
*Attorney, Agent, or Firm*—Wood, Herron & Evans

[57] ABSTRACT

An improved pneumatic control for a zero pressure accumulating conveyor includes, in a discharge zone control, a first control valve and a master control valve cooperating to produce an accumulating function for one position of the master control valve, and a continuous discharge zone operation for a second position of the master control valve while all loaded upstream zones operate sequentially upon clearing of their respective adjacent downstream zones. Accumulated items in the discharge zone and in the next upstream zone are sequentially, and not simultaneously, conveyed upon movement of the master control valve to its second position.

4 Claims, 3 Drawing Sheets

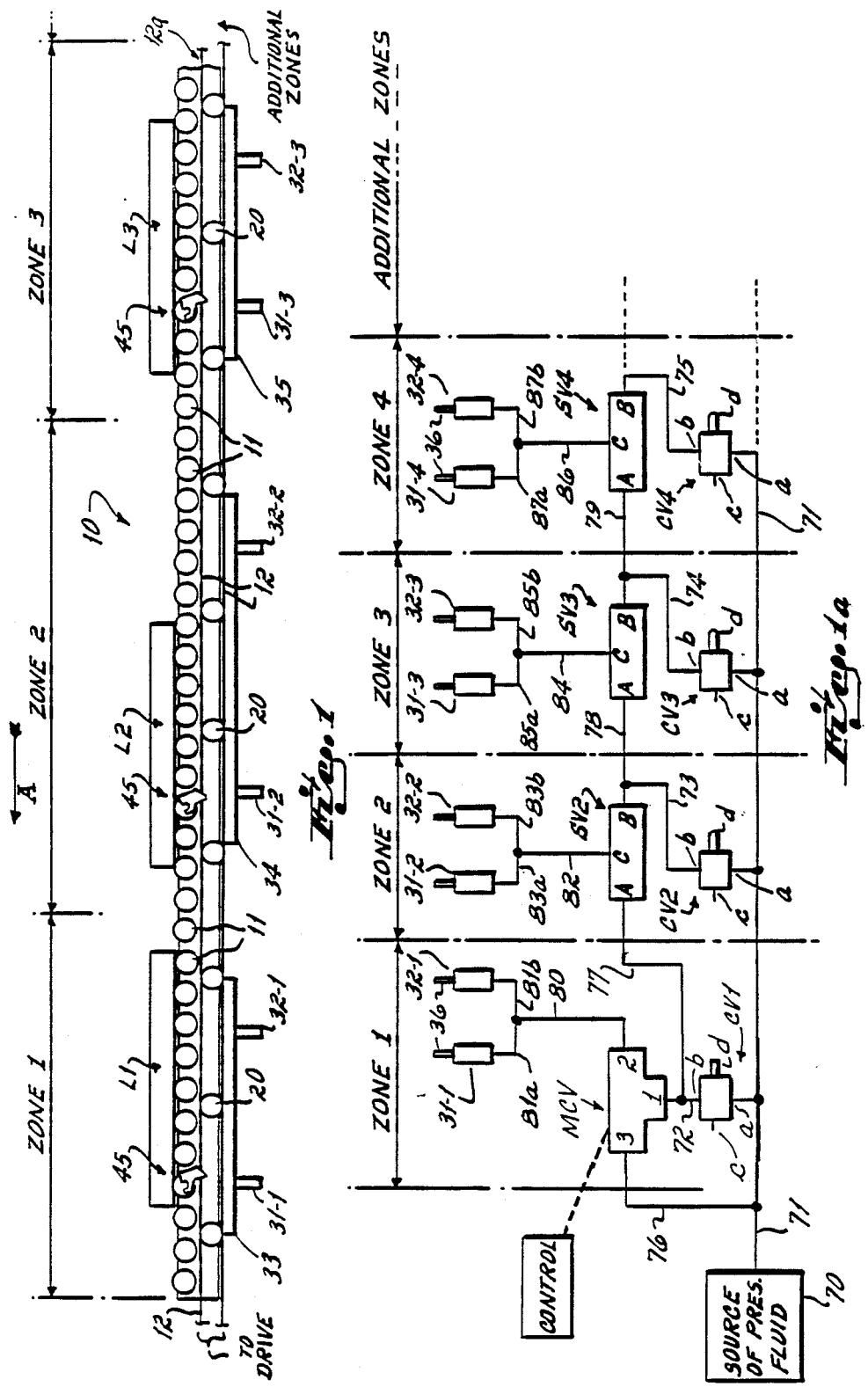

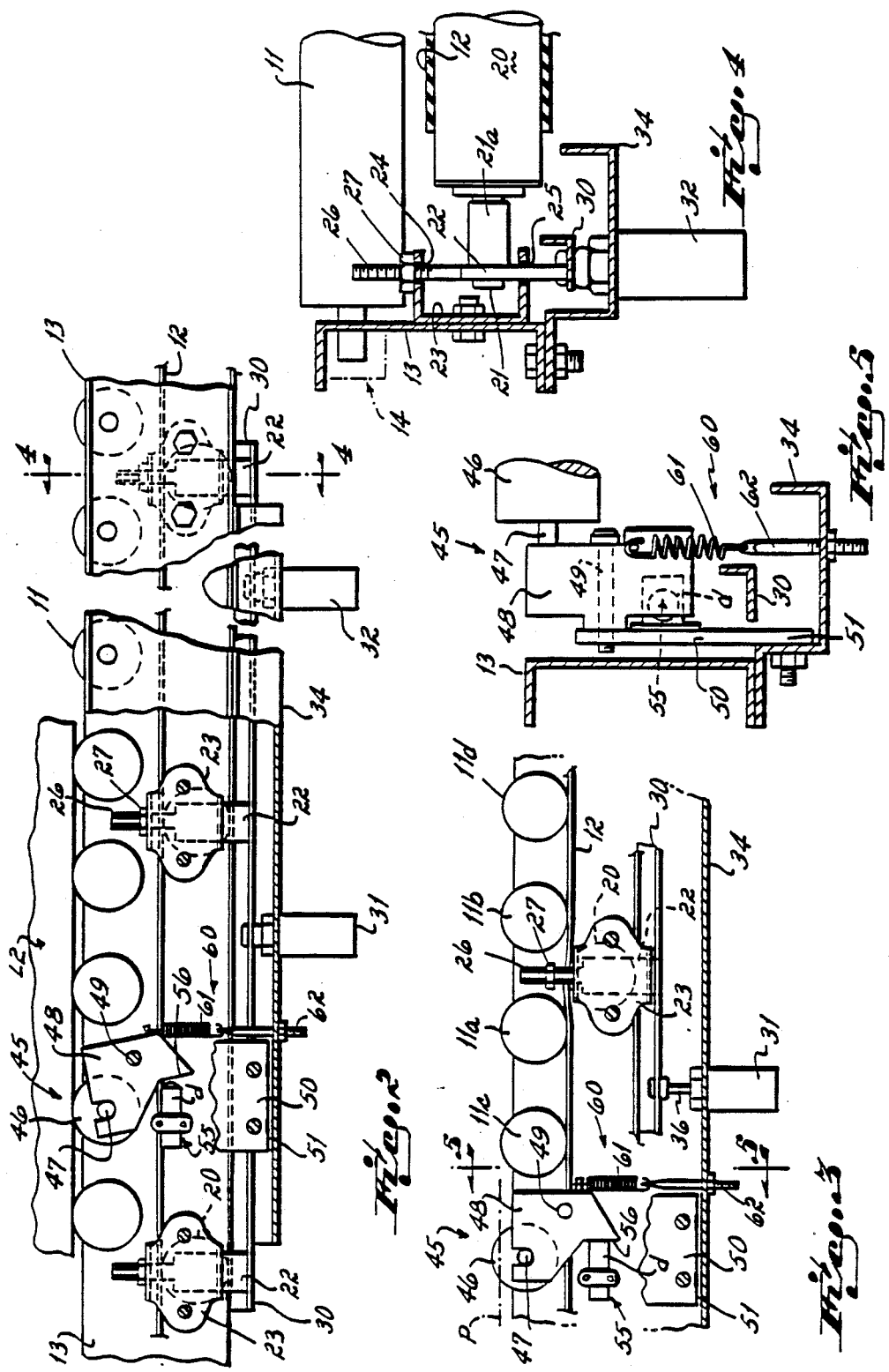

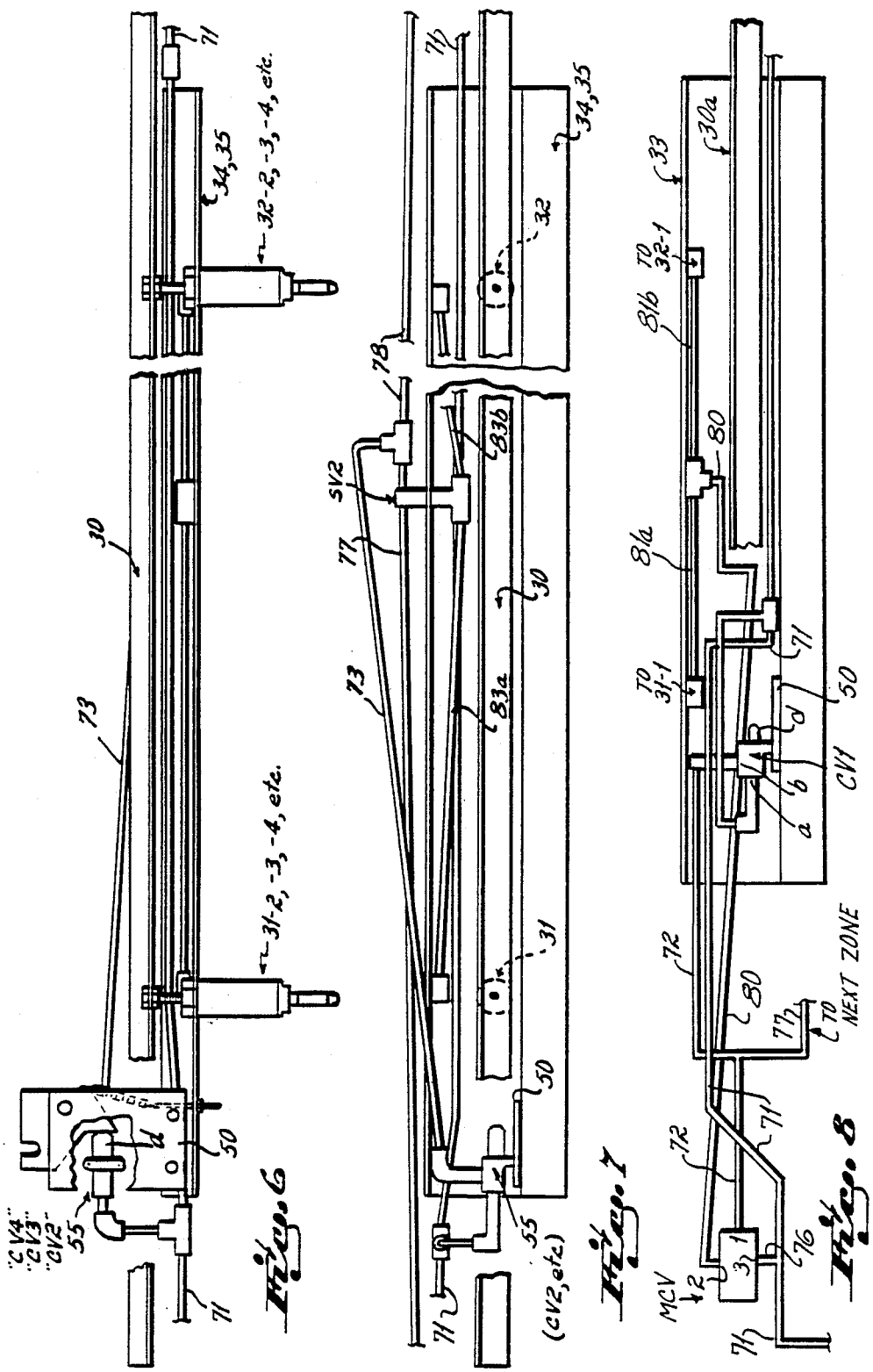

ZERO PRESSURE ACCUMULATING CONVEYOR CONTROL

This invention relates to accumulating conveyors and more particularly to pneumatic controls for zero pressure accumulating conveyors wherein loads accumulate, preferably without contacting one another with any significant force.

More particularly, this invention comprises an improvement of the apparatus disclosed in copending Application Serial No. 356,213 filed on Mar. 8, 1982, now abandoned entitled ZERO PRESSURE ACCUMULATING CONVEYOR AND MODULE, Steven Jay Morgan and Gary Lin Martin, Inventors.

In that application, the disclosed pneumatic control functions to accumulate loads within discrete accumulating zones. When that conveyor was to discharge, the master control valve was moved to a second position and, by reason of its design, functioned to energize both the discharge zone and the immediate upstream zone substantially simultaneously. Further upstream zones operated sequentially thereafter.

Simultaneous actuation of the two downstream zones immediately cleared these two zones, however, spacing or separation of the first two loads could be closer than the separation of the remaining loads. It is now desired to insure uniform separation of all loads, including the first and second loads to be discharged.

Accordingly, one objective of the invention has been to provide an improved control means for a pneumatically controlled zero pressure accumulating conveyor.

A further objective of the invention has been to provide improved separation for all loads discharged from an accumulating conveyor.

A further objective of the invention has been to provide improved pneumatic control means for the zero pressure accumulating conveyor described in the aforementioned patent application, insuring uniform separation of all discharged loads while at the same time obtaining the advantages of the prior conveyor.

A further objective of the invention has been to provide an improved zero pressure accumulating conveyor.

To these ends, a preferred embodiment of this invention comprises a modification of the control described in the aforesaid patent application. Such control is particularly suited to a zero pressure accumulating conveyor comprising a plurality of selectively controlled accumulation zones. More particularly, the present invention comprises a two-position master control valve connected between a first zone control valve and actuators or other means for driving the first zone. Also, an outlet port of the first zone control valve is connected to an inlet port of a shuttle valve of the next upstream zones for actuating that zone when the first zone is cleared. There is no connection between the master control valve and the control means for the next upstream zone, and the next upstream zone, as will be illustrated, can only operate upon clearing of the first discharge zone. The first and second zones, then, operate sequentially and not simultaneously in response to movement of the master control valve to a discharge position. This insures uniform separation of the first two loads discharged from the conveyor, similar to the separation of the following discharging loads.

It will be appreciated that the pneumatic control of this invention can be utilized with various types of accumulating conveyors, controlling varying means for driving respective discharge and accumulating zones. For purposes of describing one embodiment of the invention this application is directed, without limitation, to use of this invention with the specific conveyor disclosed in the aforesaid patent application.

That conveyor includes a belt driven live roller conveyor and a control and actuator module adapted to the conveyor for controlling belt tensioning rollers for selectively engaging and disengaging a drive belt with and from load carrying rollers of defined discharge and accumulation zones in the conveyor. Each accumulation module for each accumulation zone includes a rack for lifting and lowering at least one end of the belt tensioning rollers in each zone, together with actuators, control and shuttle valves, and appropriate fluid conduits for connecting the components together and extending toward adjacent zones for operative connection thereto. The actuators, valves and conduits are mounted on a bracket which is readily mountable on a section of a belt driven conveyor to define an accumulation zone therein without requiring any significant modification to the conveyor.

The actuators of each zone are operatively connected to a rack extending along the zone beneath the belt tensioning rollers at the side of the conveyor for lifting and lowering ends of the tensioning rollers toward and away from the load carrying rollers to effect engagement and disengagement of the drive belt for conveying and accumulating articles or loads.

The pneumatic control of that conveyor, modified according to the invention herein, is particularly useful for selectively actuating the discrete accumulation conveyor zones for continuous conveying and for accumulating. Specifically, each accumulation zone includes a control valve, actuated by loads in the zone and operable to pressurize actuators in the zones for driving the zone's load carrying rollers and to vent the actuators for disengaging the load carrying rollers in the zone for accumulation, or singulation. Each accumulation zone also includes a shuttle valve interposed between the control valve of the zone and the actuators thereof, and between the same actuators and the control valve of the next downstream zone. The discharge zone of the conveyor differs somewhat from the accumulation zones, in that it has no shuttle valve like that of the accumulation zones, but rather is controlled by a master control valve as will be described according to this invention. Nevertheless, this zone also provides an accumulation function as will be described.

In the discharge zone, according to the invention, the control valve thereof is connected directly to the master control valve and as well directly to the shuttle valve of the next upstream zone without passing through the master control valve.

In a singulation mode, i.e., during continuous conveying, the shuttle valve of an accumulation zone is operated automatically to pressurize the actuators and thus drive the load carrying rollers of the zone when there are no loads on the downstream zone, or when there is a load on the downstream zone, but no load in the zone in question. Also, the shuttle connects the actuators to vents in the control valves to vent the actuators when loads are present on the next downstream zone and the zone in question.

The downstream discharge zone control means includes the master control valve described above, and a control valve, but does not include a shuttle valve. In a continuous conveying position, the master control valve of this invention passes pressurized fluid directly to the discharge zone actuators. The discharge zone is driven immediately, and succeeding zones, having accumulated loads, are energized thereafter in succession only as the preceeding zone is cleared. This is true of the zone immediately upstream of the discharge zone, since its actuators can be operated only upon receipt of pressurized air from the downstream control valve or the control in their own zone.

In an accumulation mode position, the master control valve simply connects the control valve of the discharge zone to the actuator of that zone. The shuttle valve of the next upstream zone is connected to the discharge zone's control valve, and not to any output from the master control valve.

Operation of these two zones then continues similarly to the other zones. As a load operates the control valve of the discharge zone, it vents the actuators to disengage the drive for that zone. When a succeeding load arrives on the next zone, it operates the control valve of that zone to vent that zone's actuator and disengage that zone's drive. Accumulation continues thereafter throughout the length of the accumulation conveyor and without the loads constantly engaging one another.

The preferred embodiment thus provides improved control means by which a load on the discharge zone is first discharged before the next zone is operated. This promotes equalizing separation between all loads discharged. Moreover, the invention, including improved pneumatic control means, retains the same advantages of the conveyor of the aforesaid patent application, providing improved means easily adapted to belt driven live roller conveyors for accumulation in one mode and for singulation and separation of loads in another mode.

Moreover, it will be appreciated that the invention, including the entire pneumatic control with which it is used, can be utilized in many varied forms of accumulating conveyors without departing from the scope hereof.

These and other objects and advantages will become readily apparent from the following description of a preferred embodiment of the invention and from the drawings in which:

FIG. 1 is a diagrammatic elevational view of a conveyor according to the invention;

FIG. 1a is a diagrammatic view of a pneumatic control circuit according to the invention;

FIG. 2 is a broken side view of an accumulation zone of a conveyor according to the invention;

FIG. 3 is a view similar to FIG. 2 showing the belt tension roller in a raised position for driving the belt;

FIG. 4 is a cross sectional view taken along lines 4—4 of FIG. 2;

FIG. 5 is a cross sectional view taken along lines 5—5 of FIG. 3;

FIG. 6 is a side view of a control and actuator module of a conveyor with which the invention is used;

FIG. 7 is a plan view of the module of FIG. 6; and

FIG. 8 is a plan view of a discharge zone module and associated controls according to the invention.

Turning now to the drawings, a conveyor 10 with which the invention is used is depicted in FIG. 1. The conveyor 10 constitutes a powered belt driven live roller conveyor capable of accumulating separate loads in various zones. FIG. 1 depicts loads L1, L2 and L3 accumulated in the respective zones 1, 2 and 3. As shown in FIG. 1, the conveyor has zones 1, 2, 3, etc., as many as are necessary to accomplish a desired accumulating mode. Zone 1 of the conveyor as depicted in FIG. 1 will be referred to as a discharge zone, the conveyor or machine direction being in the direction of arrow A. Other zones will be referred to as accumulation zones.

It will be appreciated that further conveyor structure may be disposed downstream of zone 1. Take-off sections, discharge chutes, package stops, or the like can be located in this area.

Preferably, the conveyor 10 includes conveyor rollers 11 and a drive belt 12 disposed beneath the rollers for rotating them to drive loads in the machine direction. In this regard, it will be appreciated that the belt 12 has an upper driving run 12a disposed for selective engagement with the rollers 11, the drive run of the belt operating in a reverse direction to that of the machine direction so as to rotate the rollers in appropriate directions for conveying the loads downstream. The drive means for the belt is conventional, such as a motor driven belt, drum or pulley, and does not constitute a part of the invention. It is referred to only by reference in FIG. 1.

The rollers 11 are mounted between side conveyor rails 13 by means of appropriate shafts and bearings 14, as is well known in the art (FIG. 4). It will be appreciated that each zone includes a plurality of rollers 11 which can be selectively connected to the drive belt, as described herein. Apart from the structure selectively driving the rollers 11, and the pneumatic control means as described herein therefor, the conveyor 10 constitutes standard belt driven live roller conveyor sections, and the side rails, rollers 11, bearings, shafts and the like may be selected from stock conveyor components.

In particular, the conveyor parts are similar to current belt driven live roller conveyors in that such conveyors have load carrying rollers, drive belts and tensioning rollers for holding the drive belts against the load carrying rollers. Such continuously driven conveyors have also used tension roller adjusting apparatus, such as slide plates captured in brackets and mounting tensin roller shafts, for adjustment to continuously maintain the tension roller in a raised position.

Neverless, the conveyor 10 according to the invention constitutes a major improvement over such prior apparatus by providing means for zero pressure accumulation of loads, and for singulation or separation of loads, these functions not found in the prior, continuously running, non-accumulation conveyors.

In particular, and according to the invention, the improved conveyor constitutes a conveyor having a plurality of accumulation zones, with load carrying rollers in each zone selectively coupled and uncoupled from the drive belt for accumulation, singulation and separation purposes.

In order to selectively couple at least selected ones of the load carrying rollers 11 to the drive belt, each zone is provided with a number of belt supporting tensioning rollers 20 which are reciprocably mounted beneath the drive run of the belt 12. These rollers can be selectively raised in each zone to selectively and operatively couple the drive run of the belt 12 with the load carrying rollers 11.

FIGS. 2-5 illustrate the structural components of the conveyor 10 and depict the details of the conveyor for selectively coupling the load carrying rollers of each zone to the drive belt 12. FIG. 4 depicts a cross sectional view showing the load carrying rollers 11, conveyor side rails 13 and the belt supporting rollers 20. As shown in FIG. 4, rollers 11 extend between side rails 13, only the lefthand rail being shown. The belt supporting tension rollers 20 are mounted on shafts 21. At least one end of shaft 21 is in turn mounted in a slide plate 22, spaced from roller 20 by a spacer 21a. The other end of shaft 21 may also be mounted in a similar slide plate 22 at the other end of roller 20, or it may be mounted in side rail 13 at the other side of the conveyor. In any event, it is important to note that at least one end of the roller 20 is movably or reciprocably mounted.

In the preferred embodiment, only one end of rollers 20 in each accumulation zone are raised and lowered, while the other ends are mounted in a position so as to normally hold the drive belt very near, but not against, rollers 11. When the movable end of rollers 20 in a zone are raised, the belt is raised against rollers 11. To keep the drive run 12a of the belt 12 tracking as straight as possible, the invention contemplates preferably alternating the movable ends of rollers 20 from zone to zone. Accordingly, zone 1, for example, may have the right ends of roller 20 mounted by movable slide plates 22, zone 2 may have the left ends of rollers 20 mounted by movable slide plates 22, and so on, in alternating fashion.

Also, it should be understood that both ends of roller 20 in each zone are preferably mounted in slide plates 22. This permits adjustment of the relatively static end of rollers 20, and actuation of the slide plates mounting the other ends of rollers 20 as will be described.

Slide plates 22 on both sides of the conveyor are mounted in brackets 23. As shown in FIG. 2, each of the brackets 23 is provided with elongated ears which may be bolted to the inside of the frame rails 13 in respective positions as shown to slidably support the slide plates 22. These are secured to the side rails 13 and are provided with elongated slots 24 and 25 (FIG. 4) for slidably capturing the slide plates 22.

The slide plates 22 are further provided with a threaded section 26 extending above the slide plate on an upper side of the brackets 23, as shown in FIG. 4. This threaded section preferably constitutes a threaded section of an integral or welded part of the formed slide plate 22. A nut 27 is threaded onto the threaded section 26 and may be screwed down onto the top of the bracket 23 in order to act as a stop for motion of the belt support roller 20 in a downward direction. The threaded section 26 and nut 27 provides an adjustable means for limiting the lowermost position of the belt supporting rollers 20. In this regard, it will be appreciated that the slots 24 are large enough to accommodate the threaded portion 26 of the slide plate.

Each zone is defined in part by a control and actuator module. Each module includes a module bracket, actuator means mounted thereon, control means mounted thereon, conduit means mounted thereon, and a rack or bar carried by extendable portions, such as pistons, of the actuator means, all of which will be hereinafter described in more detail.

Each module is adapted for connection to the rail 13 of the conveyor 10 to provide control and actuation for the conveyor components described above in order to provide accumulation, singulation and separation. It will be appreciated that the modules thus provide means for improving a normal belt driven live roller conveyor to a zero pressure accumulation conveyor Turning to a description of the modules, each includes a rack or bar 30 which will be positioned beneath the movable slide plates 22 of the rollers 20 in the respective zone. Each of the racks 30 are mounted on actuating means such as compressed air operated cylinders 31 and 32 as shown in FIG. 2. Alternatively, hydraulic cylinders or other motive means might be provided Preferably, however, cylinders 31 and 32 in each of the zones comprise single acting, spring return, front nose mounted, air cylinders, as are well known in the art. A stroke length of one-half inch has been found suitable for normal duty applications, the cylinder having a bore of approximately one and one-sixteenth inches The racks 30 are mounted on the piston ends of the cylinders which are in turn mounted on module brackets 33, 34 and 35 as shown in FIGS. 1 and 6. It will be appreciated that the cylinder and rack mounting is similar for each of the zones shown in FIG. 1, even though the length of the rack and the number of rollers 20 (and rollers 11) in each zone might differ as required Moreover, it will also be appreciated that racks 30 will be long enough to underlie any number of belt support rollers 20 in order to fully and operationally engage the drive belt 12 with the load carrying rollers 11 of the zone. Where numerous rollers 20 are used in each zone, it may be necessary to use either multiple racks or multiple actuators operating simultaneously in the zone to insure proper belt tensioning.

FIG. 1 depicts either three or four belt supporting tensioning rollers 20 mounted in each zone. This is optional, depending on the desired frictional forces required for the load carrying rollers 11. If necessary, a suitable number of belt supporting rollers 20 can be located on the conveyor so as to urge the belt directly against each of the load carrying rollers. As shown, however, for example in zone 2, there are four load carrying rollers 11 disposed between each of the belt supporting rollers 20. This is a function of the capacity of the conveyor and the drive tension required as a result of the nature of the loads which will be conveyed thereon as will be appreciated by those of ordinary skill in the art.

While FIG. 2 shows rollers 20 in a lowered or non-driving condition, FIG. 3 depicts a load carrying roller 20 in an upraised condition, urging the belt 12 into contact with two load carrying rollers 11a and 11b. In this position, the belt 12 is also raised upwardly so that it not only contacts load carrying rollers 11a and 11b, but also load carrying rollers 11c and 11d, for example, in order to drive all of the load carrying rollers. In the position shown in FIG. 3, a piston rod 36 of the cylinder 31 (and a similar piston rod of the associated cylinder 32, not shown in this figure) has been extended by control means for the cylinders in order to raise the rack 30 upwardly and thereby carry the belt 12 on the rollers 20 into engagement with the load carrying rollers 11.

In this regard it will be appreciated that the module is mounted such that the rack 30 is disposed to contact and lift slide plates 22 when the cylinders are actuated to extend their respective pistons. When the cylinders are vented, they are preferably spring-returned to lower the rack 30. Thus slide plates 22 and roller 20 are lowered to remove belt 12 from rollers 11 and then disengage the drive from the zone.

The conveyor 10 also includes signal roller and switch or valve means 45, as depicted in detail in FIGS. 2, 3 and 5. Turning to FIG. 2, a signal roller 46 is mounted on a shaft 47 between a pivoting bracket 48, mounted for pivoting around shoulder screw 49 and an opposite conveyor side rail 13. FIG. 5 depicts the lefthand bracket 48 mounted on the screw 49, which in turn is secured to a standard 50 having a lower end 51 mounted on the bracket 34.

A control valve means such as a pneumatic valve 55 is also secured to the standard 50 in operative relationship with a valve operating flat 56 of the bracket 48. The pneumatic valve 55 constitutes a control valve, one of which is located in each of the accumulating zones of the conveyor, on the module bracket FIG. 1a depicts such pneumatic control valves and identifies them as CV1 in zone 1, CV2 in zone 2, CV3 in zone 3, CV4 in zone 4, etc. These valves are connected by suitable pneumatic conduits as will be described within the control means for the actuators 31 and 32.

An adjustable spring means 60 including a spring 61 and an adjustment bolt 62, is connected between the bracket 48 and the bracket 34 (FIGS. 2, 3 and 5) in order to preload the bracket so as to raise the signal roller 46 into the path of a load (such as load L2 as shown in FIG. 2). In the position as shown in FIG. 2, the spring 61 has been extended due to the engagement of the signal roller 46 by the load L2. As shown in FIG. 3, the spring 61 has contracted to raise the roller 46 into the path P of loads, no load being on the conveyor section as shown in FIG. 3.

When the load engages the signal roller, as shown in FIG. 2, the signal roller is depressed to pivot the bracket 48 and move the valve engaging portion 56 away from the valve. This opens or vents the valve, as will hereinafter be described. In the position as shown in FIG. 3, the signal roller is in its normal raised position such that the valve engaging portion 56 of the bracket 48 engages the valve to close the valve, as will also be hereinafter described.

The actuators or cylinders of each zone are selectively operated in order to raise the belt support rollers 20 within each zone at a desired time in order to drive the load carrying rollers of the zone. When the actuators are not pressurized, the racks 30 remain in their lowered position, with the belt support rollers 20 still supporting the belt 12 but in a position beneath the load carrying rollers 11 so that the load carrying rollers are not driven (FIG. 2). Selective actuation of the actuators of each zone is operable to raise the racks 30 and thereby drive each zone as will be described.

Preferably, pneumatic control means associated with each module are utilized in order to control the actuators 31 and 32 of each zone. As stated, hydraulic actuators and control means or electrical solenoids and electrical control means could be utilized as well. Turning now to FIG. 1a, each of the actuators 31 and 32 for the zones 1 through 4 are shown, the identifying number for each having a suffix numeral added to identify the zone in which the actuator is disposed. Additional zones and similar actuators and controls can be provided as required for any suitable accumulating length conveyor. The control means for the accumulator conveyor includes a source of pressurized fluid 70, such as compressed air, having a main supply conduit 71 for supplying the various valves and actuators.

Each of the zones includes a control valve, designated as CV1 through CV4 and corresponding to the pneumatic valve 55 which has been described above. Each control valve 55, i.e., each control valve CV1 through CV4, constitutes a normally closed, three-way, poppet valve having an input, an output and an exhaust port for venting the output side of the valve, and a control stem for actuation by the bracket 48, as has already been described. The input port (a) of each control valve 55, is connected to the supply conduit 71 and the output port (b) of each control valve is connected to the respective conduit 72, 73, 74 and 75, as shown in FIG. 1a. The exhaust port (c) of each valve is simply vented to the atmosphere. Each of the valves is normally closed by spring means within the valves to connect the ports (a) and (b) in the valve so as to pressurize the conduits 72 through 75. When the valves are actuated, however, by means of the bracket 48, so as to depress the respective control stems (d) of each valve, the valves are operable to disconnect their ports (b) from the ports (a) and to vent the ports (b) and the respective conduits 72 through 75 through the exhaust ports (c). In this regard, it will be appreciated that the stems or movable portions (d) of each control valve can be directly actuated by the brackets 48. Ball actuators or other linkages can be used for operating the control valves.

A master control valve MCV, is provided in discharge zone 1 and has an inlet port 1, an inlet port 3, and an outlet port 2. Inlet port 1 is connected to the conduit 72 from the control valve CV1. Inlet port 3 is connected through a conduit 76 directly to the supply conduit 71. Outlet port 2 is connected to the conduit 80, which extends to conduits 81a and 81b leading to the actuators 31-1 and 32-1. It is noted that conduit 72 is connected directly to conduit 77 leading to inlet port (a) of shuttle valve SV2 in zone 2. It is also noted that inlet port 3 and inlet port 1 of master control valve MCV are never connected.

The master valve MCV comprises a solenoid-operated poppet valve which is selectively actuated to alternately connect the inlet port 1 with outlet port 2, or the inlet port 3 with the outlet port 2. While any suitable valve can be utilized to perform this function, one particular valve which has been found suitable is a valve made by Mac Valves, Inc. as its Series No. 100, selector, in-line, normally closed, normally open valve. Such a valve is connected to electrical or other suitable control means (labeled "CONTROL") for operation as will be hereinafter described. Also, the valve MCV could be manually operated.

Each of the zones upstream of discharge zone 1, and exclusive of zone 1, include shuttle valves designated SV2 for zone 2, SV3 for zone 3, and SV4 for zone 4. Each of the shuttle valves has inlet ports A and B and an outlet port C. The inlet port A is connected to a conduit 77, 78 or 79, for example, extending from the next downstream zone. Conduit 77 extends from the outlet conduit 72 of the control valve CV-1. Conduit 78 extends from the inlet port B of shuttle valve SV2 and is connected with a conduit 73 from the control valve CV2. Conduit 79 is connected to both the inlet port B of the shuttle valve SV3 and the conduit 74 of the control valve CV3.

Each of the shuttle valves comprises a poppet type shuttle (double check) valve. One such suitable shuttle valve which has been found useful is a shuttle valve referred to as the Clippard "mini-Matic" shuttle valve, Model MJSV-1, produced by the Clippard Valve Company, Cincinnati, Ohio. In each shuttle valve, port A or port B is connected to outlet port C, depending on the application of pressure to port A or port B, as will be described.

Further describing the pneumatic circuitry as depicted in FIG. 1a it will be appreciated that the actuators 31-1, 32-1 are connected via conduits 80, 81a and 81b to the output port 2 of the master control valve. In zone 2, the actuators 31-2 and 32-2 are connected to the outlet port C of the shuttle valve SV2 via conduits 82, 83a and 83b. In zone 3, the actuators 31-3 and 32-3 are connected to the outlet port C of shuttle valve SV3 by common conduit 84, 85a and 85b. And in zone 4, the actuators 31-4 and 32-4 are connected to outlet port C of shuttle valve SV4 via conduits 86, 87a and 87b.

Finally, it will be appreciated that the control valve CV-1 of discharge zone 1 is connected directly to inlet port A of shuttle valve SV-2 in the next upstream zone 2. The master control valve is not interposed between control valve CV-1 and inlet port A of shuttle valve SV-2.

Returning now to the modular aspect of the invention, it will be appreciated that the conduits, valves, cylinders, racks, and module mounting brackets all comprise a control and actuator module for each zone. A drive and control module for each accumulation zone is shown in FIGS. 6 and 7. The control and actuator module for the discharge zone is shown in plan view only in FIG. 8.

The utilization of these modules facilitates modification of a standard component belt driven roller conveyor to perform as a zero pressure accumulating conveyor according to the invention.

FIG. 6 shows the accumulation modules to be ultimately attached to the conveyor. In this regard, it will be seen that the racks 30 are separate from the various slide plates for the respective rollers, the lower ends of the slide plates simply resting on the racks 30.

Turning to FIG. 7, it will be appreciated that the control valves for each of the accumulation modules and zones, that is control valves CV2, CV3 and CV4, are each mounted on the brackets 34, 35, etc. by any suitable means. Likewise, the shuttle valves SV2, SV3 and SV4 for the respective modules and zones are each mounted on their respective modules by securing same by any suitable means to the brackets 34, 35, etc. Any suitable conduits and fittings can be used in connection with the various valves and cylinders in order to facilitate the attachment of the respective conduits and components together as shown. The fittings are shown only diagrammatically in the drawings as rectangular components, and it will be appreciated that various length conduits, as required, are supplied for connecting the modules together as described, once applied to a conveyor. Also, it will be appreciated that the actual connection of the respective cylinders to the conduits 83a and 83b (FIG. 7) and 81a and 81b (FIG. 8) are not shown for reasons of clarity, these cylinder fittings being shown only diagrammatically as rectangles at the end of these conduits.

The discharge zone module varies somewhat from the accumulation zone modules and is depicted in FIG. 8. The discharge zone module includes a bracket 33 for eventual mounting to a conveyor side rail 13, similar to that of the brackets 34, 35, etc. The bracket 33 carries the respective cylinders 31 and 32, a rack 30a, a control valve CV1, and the respective conduits as shown in both FIGS. 1a and 8. The master control valve MCV is connected to the module of the discharge zone via the conduits 71, 72, 76, 77 and 80 at any suitable location on the conveyor.

The utilization of the modules as described herein facilitates the manufacture of an accumulating conveyor without requiring that each conveyor be specially designed. It is a simple matter to simply add further zones by utilizing the control and actuator modules as described in connection with other standard conveyor parts.

OPERATION

Returning now to FIGS. 1 and 1a, the operation of a conveyor according to the invention will now be described.

Primarily, the conveyor operates selectively in either a continuous conveying mode or an accumulation mode. In a continuous conveying mode, the conveyor functions to separate, or singulate loads. Particularly, the master control valve MCV is operated by any suitable control means, such as the input of an electronic signal, to operate the solenoid of the valve to connect port 3 of the valve with port 2. This provides pressurized air directly from the source of pressurized fluid 70 to the conduit 80, and the conduits 81a and 81b to actuate the cylinders or actuators 31-1 and 32-1 of zone 1. This actuation extends the pistons of those cylinders and raises the rack 30a of zone 1 (FIG. 8) to raise the belt 12 into engagement with the load carrying rollers 11 of that zone. This drives whatever loads are on that zone off the end of the discharge zone 1. Thus, looking at FIG. 1, load L1 would be discharged from zone 1 in the direction of arrow A.

The connection of the ports 3 and 2 of the master control valve MCV serves only to connect the source of pressurized fluid directly to actuators in the first discharge zone. While the load remains within zone 1, it depresses the signal roller 45, venting control valve CV1 and conduits 72 and 77. Since control valve CV2 is also vented by virtue of the pressure of load L2 therein, actuators 31-2 and 32-2 are not energized and load L2 remains stationary.

Once load L1 clears zone 1, however, control valve CV1 is operated to connect pressure line 71 to conduits 72 and 77, and thus to inlet port A of the shuttle valve SV2 in zone 2. This causes the shuttle valve to operate to connect ports A and C, thereby pressurizing conduits 82, 83a and 83b. This actuates the cylinders 31-2 and 32-2 of zone 2 to raise the belt tensioning or support rollers 20 into engagement with the load carrying rollers 11 of zone 2. When the moving belt 12 engages these rollers, the rollers rotate to drive any load, such as load L2 (FIG. 1), in a downstream direction as shown by arrow A.

Accordingly, zones 1 and 2 are driven sequentially to discharge the loads L1 and L2 (FIG. 1) therefrom in spaced, separated relationship. Thereafter, the upstream zones operate in accordance with the conditions of the control valves in the respective zones, and loads are conveyed at similar separation to those of the first two loads discharged.

For example, zone 3 remains inactive as a result of the fact that load L2 is depressing the signal roller in zone 2 and thus venting conduits 73 and 78 through the exhaust port of the control valve CV2. In addition, any load which happens to be on zone 3, such as load L3, is also depressing the signal roller of zone 3 causing the control valve CV3 to vent the conduits 74 and 79. The actuators 31-3 and 32-3 of zone 3 can only be actuated if pressure is applied to either port A or port B of the shuttle valve SV3. Since both the control valves CV2 and CV3 are vented, there can be no actuation of the actuators in zone 3. Nevertheless, as the load L2 clears zone 2, and more particularly the signal roller thereof, the signal roller operating element (d) of control valve CV2 is engaged, operating the valve to close the vent and thereby connecting the source of pressurized fluid from conduit 71 to conduit 73, and thus to conduit 78. This pressurizes, through operation of a shuttle valve SV3 to connect ports A and C thereof, the conduit 84 and the conduits 85a and 85b to actuate the cylinders of zone 3. This, of course, raises the belt tensioning or support rollers 20 of that zone to drive the load carrying rollers 11 and thus to move the load L3 in a downstream direction.

By the same token, zone 4 and any load thereon remains inactive until the load L3 clears the signal roller in zone 3, causing the control valve CV3 to operate and pressurizing the conduits 74 and 79 to actuate shuttle valve SV4 and pressurize conduits 86 and 87a and 87b of zone 4 to cause zone 4 to drive. Alternately, of course, if no load was carried on zone 4, then the control valve CV4 would not have been actuated, but rather would have been in a position to constantly convey pressure from conduit 71 through conduit 75 to the port B of shuttle valve SV4. This pressure would cause the shuttle valve to operate to connect ports B and C and thus pressurize conduits 86, 87a and 87b to actuate zone 4.

Accordingly, it will be appreciated that when the master control valve MCV is actuated to a continuous conveying mode, zones 1 and 2 are sequentially operated while zones 3, 4 and all further upstream zones are only actuated depending on the condition of the control valves in a specific zone and the immediately downstream zone. If loads are present on the zone in question and the immediate downstream zone, then the zone in question will not be operated until the load in the downstream zone clears the downstream zone. If no load is present on the zone in question, then that zone will be driven regardless of the condition of the next downstream zone for receipt of any loads coming from an upstream portion of the conveyor.

Moreover, it will also be appreciated that the master control valve MCV communicates only with the control valve and actuators 31-1 and 32-1 in zone 1 and does not communicate directly with any other actuators or valves in the conveyor. Moreover, it will also be appreciated that it is not necessary to utilize a shuttle valve in the first zone as a result of the features of the invention in connection with the control of zone 1 as described above.

Also, it will be appreciated that the conveyor, operating in this mode, is operable to separate or singulate loads as a result of the sequential operation described as closely adjacent loads flow through adjacent zones.

It will also be appreciated that zones 1 and 2 function to separate loads even when the conveyor is in a continuous conveying mode (i.e., ports 3 and 2 of the master control valve connected). Specifically, as a load is being conveyed through zone 1, it operates the control valve CV1, venting conduits 72, 77 and port A of the shuttle valve SV2 in zone 2. When a load arrives in zone 2 and operates control valve CV2 to vent conduits 73, 78, 82, 83a and 83b, the actuators 31-2 and 32-2 are discharged and zone 2 stops until the first load clears zone 1. Zone 2 is reactivated by release of CV1 (zone 1) by the first load, again pressurizing conduits 72 and 77, and port A of shuttle valve SV2. This operates to connect ports A and C thereof, wherein actuators 31-2 and 32-2 are again actuated to drive zone 2.

Turning now to an operation of the conveyor in an accumulating mode, it will be appreciated that the master control valve is operated by any suitable control means to a position where port 3 is disconnected from port 2 and port 1 is connected to port 2. Accordingly, this position of the master control valve serves to connect conduit 72 with conduit 80. When a load L1 is on zone 1 so as to depress the signal roller of that zone, the control valve CV1 is operated to vent any pressure in the conduits 72, 77 and 80, and thus conduits 81a and 81b. Accordingly, the spring actuated cylinders 31-1 and 32-1 are de-energized and the belt tensioning or support rollers 20 are maintained in a retracted position beneath the load carrying rollers 11. Zone 1 is thus not driven as long as the master control valve is in an accumulate position and a load is on zone 1.

Turning now to zone 2, it will be appreciated that when a load in zone 1 engages the signal roller of that zone, no pressure is available in conduit 77 to port A of the shuttle valve SV2 in zone 2 (the conduit 77 is vented through the control valve CV1 and conduit 72). Nevertheless, if no load is on zone 2, the actuators 31-2 and 32-2 of zone 2 are actuated as a result of the fact that control valve CV2 is open, conveying pressure from the supply conduit 71 to conduit 73 and port B of the shuttle valve SV2. This pressurizes conduits 82, 83a and 83b to cause the actuators of zone 2 to operate and thus drive the load carrying rollers of zone 2 by means of lifting the belt into contact with those rollers. As soon, however, as a load L2 appears in zone 2 and depresses the signal roller of that zone, the control valve CV2 is actuated to close off the source of pressurized fluid from the shuttle valve SV2 and to vent the conduits 73, 82, 83a and 83b. In this condition, and so long as a load remains in zone 1 and on zone 2, zone 2 will remain inactive. It will also be appreciated that the venting of the control valve CV2 serves to vent conduit 78 so as to prevent any pressure being applied to port A of the shuttle valve SV3 in zone 3.

The operation of zones 3, 4 and any following zones is similar. As loads appear on the downstream next zone, ports A of the shuttle valves and the upstream zone are vented, and accumulation along the conveyor zone occurs. The zones continue to operate, however, until loads appear on those zones, at which time the control valve for the zone is also vented. This vents the conduits through the shuttle valve port B in that zone to the actuators, thereby causing the zones to go dead, with any loads thereon remaining in the zone until the zone is again actuated when the downstream zone is cleared.

When it is desired to drive the conveyor from a stopped accumulating mode, the master control valve is cycled to connect ports 3 and 2 to drive the load from zone 1. The more upstream zones 2, 3, 4, etc. are thus operated sequentially by means of pressure appearing in the respective conduits to ports A of the shuttle valves in those zones as the immediate downstream zones are cleared. The conveyor is thus operative to singulate loads in zones 2, 3, 4, etc. when it is caused to drive loads from the discharge zone 1.

Thus, it will be appreciated that the accumulator conveyor described herein includes a plurality of zones having pneumatically operated means for selectively driving each zone in response to pneumatic control inputs according to the invention.

Moreover, the invention provides a zero pressure accumulating conveyor since each load can be stopped within its respective zone. By spacing of the zones and the rollers thereon, the loads are not required to travel into the next downstream zone when the zone in which they reside is deactivated by the control means as described herein.

In addition, it will be appreciated that the invention provides improved means by which loads on the downstream most two zones are sequentially discharged with the same or similar separation as more upstream loads.

Moreover, it will be appreciated that the modular features as described herein facilitate the modification of a conveyor to an improved zero pressure accumulator conveyor, and as well facilitate the manufacture of accumulator conveyors of any suitable length with the mere addition of a module to each accumulate zone.

It will also be appreciated that the invention provides an improved zero pressure accumulating conveyor.

Finally, it will be appreciated that the pneumatic control means described herein can be applied to various types of accumulating conveyors other than the belt driven live roller conveyor described herein.

These and other advantages and modifications will become readily apparent to those of ordinary skill in the art without departing from the scope of the invention, and applicants intend to be bound only by the claims appended hereto.

I claim:

1. An improvement in a belt driven live roller zero pressure accumulating conveyor having a plurality of load carrying rollers defining a downstream discharge zone and upstream accumulation zones, means in each zone to selectively engage with and disengage from said rollers a drive belt to drive said zones, said means including, groups of belt supporting tensioning rollers independently reciprocably mounted under said belt, fluid actuator means operatively mounted with each group of tensioning rollers for raising a group of said tensioning rollers upwardly in each zone to raise the belt into engagement with the load carrying rollers of that zone, and for dropping said group of tensioning rollers to disengage said drive belt from said load carrying rollers in that zone, a source of pressurized fluid, a control valve in each zone, a shuttle valve in each upstream accumulation zone, means connecting each control valve to said source of pressurized fluid, said control valves each operated by a load sensor in the respective zone and each being at least indirectly connected between said pressurized fluid source, any shuttle valve in their respective zones, and any shuttle valve in the next upstream zone, an output of each shuttle valve connected to actuator means for its respective zone, said actuator means in each one upstream zone being operable to raise said tensioning rollers and to effect driving of the respective upstream zone when either the control valve of the upstream zone or that of the next downstream zone is positioned to transmit pressurized fluid to the actuator means through the shuttle valve in said upstream zone, the improvement comprising:

a single, selectively operable, master valve having a first port connected to the source of pressurized fluid, a second port connected to the control valve in the discharge zone; and a third port connected to the actuator means of said discharge zone, conduit means connecting said control valve in said discharge zone directly with a shuttle valve in the next upstream zone, and with the second port of said master valve;

said master valve being selectively operable in one position to pass pressurized fluid or to vent fluid through said second and third ports and between the discharge zone's control valve and actuator means, and in another position to pass pressurized fluid through the first port to the third port and directly from said source of pressurized fluid to the actuator means in said discharge zone for actuating the actuator means in the discharge zone for continuous operation thereof.

2. An improvement in an accumulating conveyor having a plurality of load carrying rollers defining a conveying run, a drive belt extending in the direction of said run beneath said rollers and belt supporting tension roller means disposed beneath said belt for supporting and urging said belt into driving engagement with selected ones of said load carrying rollers for conveying loads along said conveyor and for dropping said belt from said selected ones of said load carrying rollers to disengage driving forces therefrom, said belt supporting rollers being divided into independent groups defining accumulating zones in said load carrying rollers, each group having pneumatic actuator means for engaging and disengaging said belt from portions of said load carrying rollers, a downstream discharge zone at a discharge end of said conveyor, and pneumatic control means for controlling said actuator means, said pneumatic control means comprising, a source of pressurized fluid, respective control valves in each zone connected between said source and said respective actuator means in each zone, a load sensor in each zone operably connected to the respective control valve for said zone, a shuttle valve in each upstream zone from said discharge zone and having an output connected to an actuator means in the respective zone, a first input connected to the control valve in said respective zone, and a second input, said second input of said shuttle valves, including that shuttle valve in an upstream zone immediately adjacent the discharge zone, connected at least indirectly to the control valve of the preceding zone, said control valves in upstream zones passing fluid from said source to the respective shuttle valves and actuator means in their respective zones and to the shuttle valve and actuator means in a next upstream zone when said sensors are not activated, and venting said shuttle valves when said sensors are activated, the improvement comprising:

a selectively actuable, two position, master control valve having a first input port connected directly to a source of pressurized fluid, a second input port connected to the control valve of the discharge zone, and an output port connected to the actuator means for the discharge zone;

said control valve in said discharge zone passing fluid said second input port and said output port of said master control valve and through said master control valve means, in one position of said master control valve, to actuator means in said discharge zone when the load sensor in said discharge zone is not activated, and venting said actuator means in said discharge zone through said second input and output ports of said master control valve when said load sensor therein is activated, said master control valve in a second position connecting said source of pressurized fluid directly to the actuator means in said discharge zone, and disconnecting the control valve therefrom, regardless of the condition of the control valve in the discharge zone, and the control valve in said discharge zone connected to an input of the shuttle valve in the next upstream zone, whereby, when said master control valve is in said second position, said discharge zone is continuously operated and the adjacent upstream zone is operated in response to the condition of the control valve in the discharge zone and the control valve in its own zone, and wherein the number of said shuttle valves equals the number of accumulating zones exclusive of said discharge zone.

3. An improved pneumatic control for accumulating conveyors of the type having a downstream discharge zone and a plurality of upstream accumulating zones for accumulating loads, and having pneumatically operated means for selectively driving each zone in response to pneumatic control inputs, each zone including a control valve, each upstream zone including a shuttle valve, the control valve of each upstream zone passing pressurized air to the shuttle valve in the respective zone and to the shuttle valve in the next upstream zone when the respective zone is free of a load, the shuttle valve of each upstream zone passing pressurized air to the pneumatically operated means when said shuttle valve receives pressurized air from a control valve, the improvement comprising:

a master control valve in the discharge zone having a first input port connected to a source of pressurized air, said master control valve having a second input port connected to the control valve in the discharge zone and an output port connected to the pneumatically operated means of the discharge zone, said master control valve in one position passing pressurized air through said first input port and said output port directly from said source to said pneumatically operated means in said discharge zone, and in a second position operatively connecting said pneumatically operated means in said discharge zone to the control valve in said discharge zone, said master control valve selectively connecting one of said first and said second input ports to said output port exclusively of the other, each control valve having an output port and each shuttle valve having at least one input, the output port of said control valve in said discharge zone directly to an input of a shuttle valve in the zone next upstream from the discharge zone.

4. An improved pneumatic control means for a discharge zone of an accumulating conveyor having upstream accumulating zones wherein said conveyor includes respective pneumatically operated means for selectively driving each of said zones, said improved pneumatic control means comprising:

a master control valve having a first input connected directly to a source of pressurized air, a single output connected directly to the pneumatically operated means of said discharge zone, and a second input, said master control valve selectively connecting one of said first and second inputs to said output exclusively of the other, a control valve connected to said source of pressurized air and having an output connected directly to said second input of said master control valve, a shuttle valve means in an upstream zone adjacent said discharge zone for selectively passing pressurized fluid to the pneumatically operated means of said upstream zone, said shuttle valve means having at least one input, and said control valve output also connected directly to said input of said shuttle valve means.

* * * * *

UNITED STATES PATENT AND TRADEMARK OFFICE
CERTIFICATE OF CORRECTION

PATENT NO. : 4,817,784
DATED : April 4, 1989
INVENTOR(S) : Gregory R. Judge

It is certified that error appears in the above-identified patent and that said Letters Patent is hereby corrected as shown below:

In Column 4, Line 41, "tensin" should be --tension--.

In Column 6, line 11, add a period after the word --inches--.

In Column 6, line 17, add a period after the word --required--.

In Column 7, line 8, add a period after the word --bracket--.

In Column 16, line 9, after the word "zone" insert the word "connected".

Signed and Sealed this

Second Day of January, 1990

*Attest:*

JEFFREY M. SAMUELS

*Attesting Officer*     *Acting Commissioner of Patents and Trademarks*